US006824598B2

(12) United States Patent
Thornberry et al.

(10) Patent No.: US 6,824,598 B2
(45) Date of Patent: *Nov. 30, 2004

(54) INKJET INK SETS WITH COMBINATIONS OF LIGHT DYE LOAD AND DARK DYE LOAD

(75) Inventors: Matthew Thornberry, Corvallis, OR (US); Eric L Burch, San Diego, CA (US); John L Stoffel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/309,463

(22) Filed: Dec. 3, 2002

(65) Prior Publication Data

US 2003/0110980 A1 Jun. 19, 2003

Related U.S. Application Data

(63) Continuation-in-part of application No. 09/599,352, filed on Jun. 20, 2000, now Pat. No. 6,521,030.

(51) Int. Cl.[7] ............................................... C09D 11/02
(52) U.S. Cl. ............................... 106/31.27; 106/31.47; 106/31.49; 106/31.51; 106/31.52
(58) Field of Search ........................... 106/31.27, 31.47, 106/31.49, 31.51, 31.52, 31.37; 347/100

(56) References Cited

U.S. PATENT DOCUMENTS

| 5,833,743 | A | * | 11/1998 | Elwakil .................... 106/31.27 |
| 5,997,622 | A | | 12/1999 | Weber et al. |
| 6,001,161 | A | | 12/1999 | Evans et al. |
| 6,322,188 | B1 | * | 11/2001 | Sano .......................... 347/15 |
| 6,379,441 | B1 | * | 4/2002 | Kanaya et al. ........... 106/31.49 |
| 6,423,375 | B1 | | 7/2002 | Bi et al. |
| 6,454,844 | B1 | * | 9/2002 | Kanaya .................... 106/31.48 |
| 6,511,171 | B2 | * | 1/2003 | Yoshizawa et al. ......... 347/100 |
| 6,521,030 | B1 | * | 2/2003 | Stoffel ..................... 106/31.27 |
| 6,673,140 | B2 | * | 1/2004 | Tyrell et al. ............... 106/31.5 |
| 2002/0018107 | A1 | * | 2/2002 | Yakushigawa et al. ..... 347/100 |
| 2002/0112641 | A1 | | 8/2002 | Naruse et al. |
| 2002/0135649 | A1 | | 9/2002 | Yoshizawa et al. |
| 2003/0089274 | A1 | * | 5/2003 | Nishita et al. ........... 106/31.48 |
| 2003/0097959 | A1 | * | 5/2003 | Omatsu et al. .......... 106/31.43 |
| 2003/0101904 | A1 | * | 6/2003 | Morris et al. ............ 106/31.48 |
| 2003/0150354 | A1 | * | 8/2003 | Ito et al. .................. 106/31.27 |

FOREIGN PATENT DOCUMENTS

| EP | 0985716 | 3/2000 |
| EP | 1164174 | 12/2001 |
| EP | 1172422 | 1/2002 |

OTHER PUBLICATIONS

"Revised List Of Bills To Be Considered As Part Of A Duty Suspension And Miscellaneous Technical Measures Package"; Revised Jun. 28, 2002; 17 pages; Web URL: http://finance.senate.gov/Public/publiccomment.pdf.

107th Congress 2d Session "H.R. 4494—To Suspend Temporarily The Duty On Cyan 485 Stage"; In The House Of Representatives Apr. 18, 2002; 2 pages; URL: http://frwebgate.access.gpo.gov/cgi-bin/getdoc.cgi?dbname= 107_cong_bills&docid= f:h4494ih.txt.pdf.

"National Industrial Chemicals Notification And Assessment Scheme" (Yellow Y–1189); Feb. 3, 2000; File No.: NA/742; Full Public Report; 16 pages; URL: http://www.nicnas.gov.av/publications/CAR/new/NA/NAFULLR/NA0500FR/NA742FR.pdf.

* cited by examiner

*Primary Examiner*—Helene Klemanski

(57) ABSTRACT

An ink set for ink-jet printing, having at least one ink of the ink set comprising a light dye load and a dark dye load with both the light dye load and the dark dye load being one color. The one color is selected from magenta, cyan, yellow and black; and the light dye load being at least one of air fade resistant, light fade resistant and humid color migration resistant. The invention also relates to a method of inkjet printing with such a method.

54 Claims, 1 Drawing Sheet

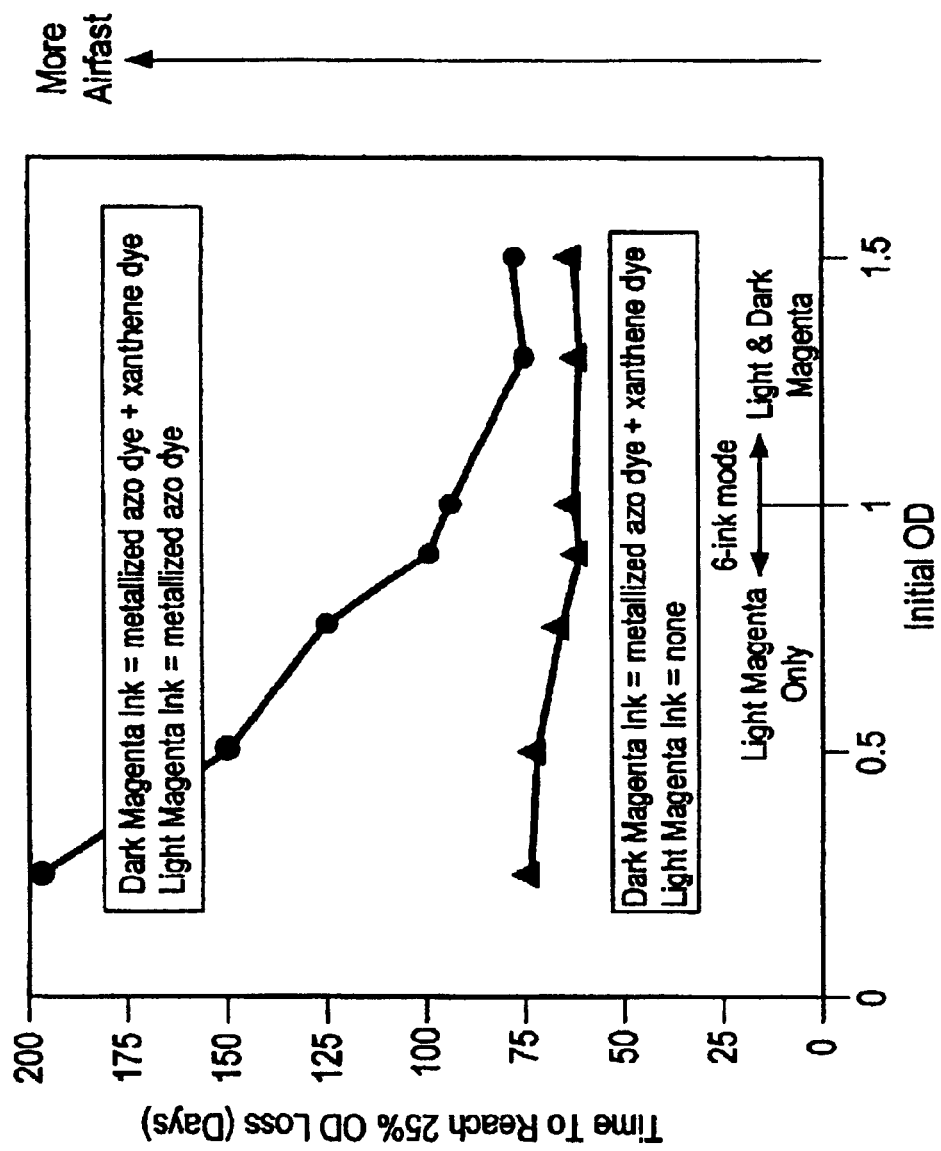
*Figure*

US 6,824,598 B2

INKJET INK SETS WITH COMBINATIONS OF LIGHT DYE LOAD AND DARK DYE LOAD

The present application is a continuation in part of U.S. patent application Ser. No. 09/599,352, filed on Jun. 20, 2000 now U.S. Pat. No. 6,521,030.

FIELD OF THE INVENTION

The present invention relates to inkjet printing, and in particular to a specific ink set with combinations of light and dark dye load of a given color for improving inkjet image quality.

BACKGROUND OF THE INVENTION

Color inkjet printers typically use three inks of differing hue: magenta, yellow, and cyan, and optionally black. The particular set of colorants, e.g., dyes, used to make the inks is called a "primary dye set." A spectrum of colors, e.g., secondary colors, can be generated using different combinations of the primary dye set.

A successful ink set for color inkjet printing must be compatible with the inkjet pen and printing system. Some of the required properties for the inkjet ink include: good crusting resistance, good stability, the proper viscosity, the proper surface tension, little color-to-color bleed, rapid dry time, no negative reaction with the vehicle, high solubility of the dyes in the vehicle, consumer safety, low strike through, high color saturation, and good dot gain.

Furthermore, the colored characteristics of the colorants play an important role in the quality of the printed inkjet image. Up to the present time, color inkjet inks have been designed and tailored for printing business graphics such as depiction of information in the form of "pie-charts" and "bar-charts" on plain paper. These applications require that inkjet use bright, vivid, high chroma colorants that, in general, are neither lightfast nor resistant to air fade.

One attribute that is particularly important in imaging (i.e., color rendition of pictures) is "grain". Grain describes how visible the dots are to the viewer. If large, dark drops are used, the dots become very visible and image quality is degraded.

One technique to reduce grain is to use smaller drop weight to produce nearly invisible drops. The down side to this technique is the need for more difficult and more costly manufacturing processes due to the requirement for smaller orifice holes and resistors and more difficult reliability challenges due to the smaller holes.

Another technique is to use additional "light" inks such as a light magenta or cyan at colorant loadings 5–25% of the normal or dark ink. This technique allows the use of larger, low colorant load drops. These "light" drops are less visible due to the presence of less colorant. One downside to this approach is that these "light" inks fade much faster on media than the dark inks. This fade often occurs in critical areas such as the skin tone in a picture of a human being. Thus, there is a need for more lightfast and air fade resistant colorants to be used in these light inks.

SUMMARY OF THE INVENTION

The present invention relates to an ink set for ink-jet printing, wherein at least one ink of the ink set comprises a light dye load and a dark dye load, both the light dye load and the dark dye load being one color, the one color being selected from the group consisting of magenta, cyan, yellow and black; and the light dye load being at least one of air fade resistant, light fade resistant and humid color migration resistant.

The present invention also relates to a method for inkjet printing, the method comprising the step of ejecting ink from an inkjet, the ink comprising a light dye load and a dark dye load, both the light dye load and the dark dye load being one color, the one color being selected from the group consisting of magenta, cyan, yellow and black; and the light dye load being at least one of air fade resistant, light fade resistant and humid color migration resistant.

BRIEF DESCRIPTION OF THE DRAWINGS

FIG. 1 gives a graphical representation of air fade in two inkjet printing systems by graphing the time to reach 25% Optical Density loss in days vs. initial optical density of the printed image for the two inkjet printing systems, one having both light and dark magenta dyes in the ink and one having just dark magenta dye in the ink.

DETAILED DESCRIPTION OF EMBODIMENTS OF THE INVENTION

Inkjet printers are increasingly moving to a multi-dye-load configuration in which lighter colors are printed using light dye load dye inks and darker colors are printed using dark dye load dye inks. Such multi-dye-load inkjet printer configurations can however have problems because the light dye load inks fade much faster. The present application describes a multi-dye-load configuration in an inkjet printer having at least one dye of the set of cyan, magenta, yellow or black which is at least one of air fade resistant, light fade resistant, and humid color migration resistant. This dye is used in a light dye load ink in the multi-dyeload configuration along with a dark dye load ink of the same color.

Using a light ink in the multi-dyeload configuration is desirable because it allows the use of low dye loads. However, even though low dye loads reduce dot visibility and grain in photo prints, thus increasing photo quality, these same low dye loads are particularly susceptible to air fade. Accordingly, the applicants have found a way by using a combination of light dye load dye with good air fade resistance and dark dye load dye to deliver exceptional photo Image Quality (IQ) and images that are resistant to fade.

Previous ways of dealing with this problem have used a single set of dye loads or have used a light dye load that was resistant to light fade but not air fade.

The present application describes a set of inkjet inks having at least one dye of the set cyan, magenta, yellow, or black which is used as a light dyeload in a multi-dyeload printer and is at least one of air fade resistant, light resistant, and humid color migration resistant.

In one embodiment of the present application, the light dye load is from 0.1% to 2.0% by weight. In the same embodiment the dark dye load is from 2.0% to 10.0% by weight.

Non-limiting examples of the magenta dye are: anthrapyridone, H-acid (azo:H-acid), gamma acid (azo:γ-acid), xanthene types, polyvalent metal coordinated dyes (azo:Cu or Ni), or mixtures thereof.

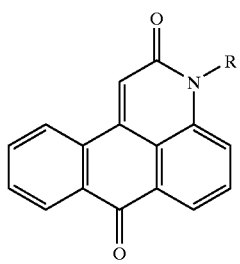

An example of an anthrapyridone is: C.I.Acid Red 81 (manufactured by Bayer AG, Leverkeusen, Germany). A generic dye structure of an anthrapyridone is given above.

Examples of H-acids (Azo:H-acids) are: Reactive Red 180 (RR180) (manufactured by Avecia Limited, Manchester, UK), Reactive Red 31 (RR31)(manufactured by Avecia Limited, Manchester, UK). A generic dye structure of an H-acid is given below:

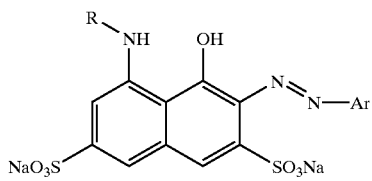

An example of a gamma acid is Magenta 377 (M377) (the same dye disclosed in U.S. Pat. No. 6,423,375 incorporated herein by reference, manufactured by Ilford Imaging GmbH, Marly, Switzerland). A generic dye structure of a γ-acid is given below.

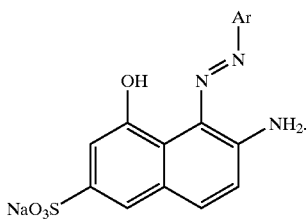

Examples of xanthene dyes are: Acid Red 52 (AR52) (manufactured by Avecia Limited, Manchester, UK) and Acid Red 289 (AR289) (manufactured by Avecia Limited, Manchester, UK).

A generic structure of a xanthene dye is given below:

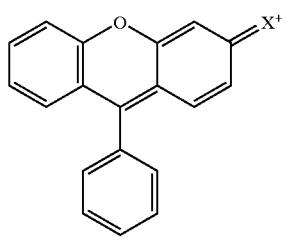

where non-limiting examples of $X^+$ can be O, $OH^+$, $N(R_2)^+$, $N(H_2)^+$, etc. Examples of polyvalent metal coordinated dyes are pyridyl azo quinolines and the closely related pyridyl azo naphthols.

A specific example of a pyridyl azo quinoline (PAQ) is an 8-heterocyclylazo-5-hydroxyquinoline, already described in the parent application, Ser. No. 09/599,352, having a structure

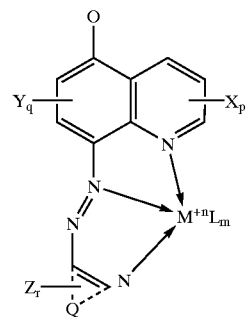

wherein:

M represents a polyvalent transition metal ion selected from the group consisting of iron, nickel, copper, cobalt, zinc, and chromium; each L independently represents a neutral or anionic ligand;

each X, Y and Z independently represents a substituted or unsubstituted alkyl group of 1–6 carbon atoms, a substituted or unsubstituted aryl group of 6–10 carbon atoms, a substituted or unsubstituted hetaryl group of 5–10 atoms, a halogen, a cyano group, a nitro group, a substituted or unsubstituted alkoxycarbonyl group of 1–6 carbon atoms, a substituted or unsubstituted alkoxy group of 1–6 carbon atoms, a hydroxy group, a polyoxyalkylene group of 2–20 alkylene oxide residues, a carboxy group or a salt thereof, a sulfo group or a salt thereof, a phospho group or a salt thereof, a carbamoyl group, a substituted or unsubstituted alkyl-, aralkyl-, aryl-, diaryl- or dialkyl-carbamoyl group of 1–20 carbon atoms, a sulfamoyl group, a substituted or unsubstituted alkyl-, aralkyl-, aryl-, diaryl- or dialkyl-amino group of 1–20 carbon atoms or a quaternary ammonium or phosphonium group; Q represents the atoms necessary to complete a 5- or 6-membered heterocyclic ring; n represents 2 or 3; m represents an integer from 1–3; each p and r independently represents an integer from 0–3; q represents 0, 1 or 2 two or more of L may be joined together to form a bi- or tridentate ligand which may optionally comprise another polydentate molecule of the same or different structure as shown above; one or more of L may be combined with X and/or Z; one or more of X, Y and Z, together with the carbon to which they are attached, may independently represent a ring nitrogen; and any two of X, Y or Z may be joined together to form a 5–7 membered saturated or unsaturated ring.

Another specific example of pyridyl azo quinoline (PAQ) is Reactive Red 23 (RR23) (Avecia Limited, Manchester, UK).

Yet another specific example is the magenta dye having the structure:

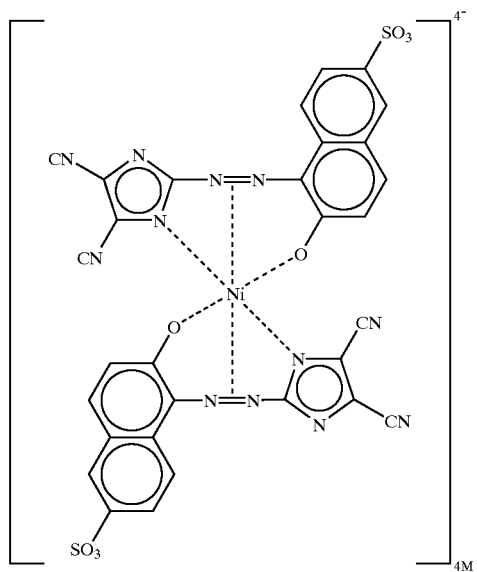

wherein M is H or a monovalent ion, such as Na$^+$, Li$^+$, K$^+$, NH$_4^+$, and combinations thereof (disclosed in application Ser. No. 10/094,911 filed Mar. 11, 2002).

A generic structure of the polyvalent metal coordinated dye, covering either pyridyl azo quinoline (PAQ) or pyridyl azo naphthol is

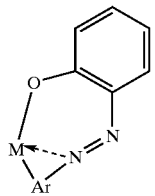

where M is a polyvalent transition metal ion selected from the group consisting of iron, nickel, copper, cobalt, zinc, and chromium.

Non-limiting examples of cyan dyes that have at least one of air fade resistance, light fade resistance and humid color migration resistance are copper phthalocyanine dyes such as the related dyes cyan 485 and cyan 485/4, both having the structure copper, (29H,31H-phthalocyaninato(2-)-xN29, xN30,xN31,xN32) aminosulfonyl((2-hydroxy-ethyl)amino) sulfonyl sulfo derivatives, sodium salt.

Non-limiting examples of yellow dyes that have at least one of air fade resistance, light fade resistance and humid color migration resistance are monoazo yellow dyes and bisazo yellow dyes such as Yellow 1189 having the structure 1,3-naphthalenedisulphonic acid, 7-((4-((4,6-bis-((3-sulfoprop-1-yl)thiol(-1,3,5-triazin-2-yl)amino(-3-methoxyphenyl)azo) tetrasodium salt.

Copper:Azo black dyes have also been found to have at least one of air fade resistance, light fade resistance and humid color migration resistance.

In another non-limiting embodiment, the dyes of the dark dye load are the same as the dyes in the light dye load.

In another non-limiting embodiment of the invention, at least one of the dyes in the dark dye load is different from the dyes used in the light dye load of the given color.

In another non-limiting embodiment, all of the dyes of the dark dye load are different from all of the dyes of the light dye load.

In yet another non-limiting embodiment, the dyes used in the dark inks are at least one of light fade resistant, air fade resistant and humid color migration resistant.

EXAMPLES

Example 1

Twenty two different magenta dyes were tested for humid shift as follows. Each magenta dye was applied to three different types of inkjet printable media: Media 1 (swellable), Media 2 (porous, Al$_2$O$_3$ coated) and Media 3 (porous, SiO$_2$ coated). Each dye was therefore tested on three different media samples. Each sample tested was exposed to 35° C./80% Relative Humidity (RH) for 4 days. Table 1 lists the humid hue shift (HF) of each sample measured in terms of ΔE (Average ΔE CIE94). When used to measure humidfastness, this value is a measure of the color difference or color shift after exposure to high humidity (4 days @ 35° C., 80%RH) and is calculated as follows: $\Delta E=[(\Delta L^*)^2+(\Delta a^*)^2+(\Delta b^*)^2]^{0.5}$. The L*a*b* values are measured before and after exposure to the humid conditions. In this system, L* defines the lightness of a color ranging from 0(black) to 100 (white). a* and b* together define the hue, with a* ranging from a negative number (green) to a positive number (red), and b*ranging from a negative number (blue) to a positive number (yellow). The average ΔE value is simply the average of all ΔE values (in other words, an average of color shift values from low to high print densities).

On Table 1 below, dyes are sorted by ΔE collective performance on all three media. Pyridyl azo naphthol (PAN) dyes were found to be the most humidfast. As shown, H-acids and γ-acids are moderately humidfast. Xanthenes, pyridyl azo quinoline (PAQ) dyes and anthrapyridones are the least humidfast. H-acids tend to fail on porous SiO$_2$ coated media such as Media 3. γ-acids tend to fail on swellable media such as Media 1. For use in this example, besides the dyes specifically mentioned in the Detailed Description section above, other related dyes are used which fall in the categories of H-acids, γ-acids, xanthenes, polyvalent metal coordinated dyes, and anthrapyridones. They include: Magenta Dye 1 (nickel:pyridyl azo naphthol); Magenta Dye 2 (nickel:pyridyl azo naphthol); Magenta Dye 3 (copper: pyridyl azo naphthol); Magenta Dye 4 (azo:H-acid); Magenta Dye 5 (azo:γ-acid); Magenta Dye 6 (copper: pyridyl azo naphthol); Magenta Dye 7 (azo:H-acid); Magenta Dye 8 (Ni:naphthol azo imidazole); Magenta Dye 9 (azo:γ-acid); Magenta Dye 10 (azo:H-acid); Magenta Dye 11 (azo:H-acid); Magenta Dye 12 (azo:γ-acid); Magenta Dye 13 (nickel:pyridyl azo quinoline); and Magenta Dye 14 (anthrapyridone).

TABLE 1

| Dye | Structure | Media 1 | Media 2 | Media 3 |
|---|---|---|---|---|
| Magenta Dye 1 | Ni:pyridyl azo naphthol | 2.4 | 1.3 | 0.8 |
| Magenta Dye 2 | Ni:pyridyl azo naphthol | 2.4 | 1.0 | 1.3 |
| Magenta Dye 3 | Cu | 1.3 | 1.5 | 2.3 |
| Magenta Dye 4 | H-acid | 1.8 | 1.7 | 1.8 |
| Acid Red 249 | azo | 1.2 | 0.8 | 2.2 |
| Magenta Dye 5 | γ-acid | 1.5 | 2.3 | 2.7 |
| Magenta Dye 6 | Copper azo | 2.2 | 2.4 | 3.1 |
| Magenta Dye 7 | H-acid | 1.8 | 1.9 | 3.3 |

TABLE 1-continued

| Dye | Structure | Media 1 | Media 2 | Media 3 |
|---|---|---|---|---|
| Magenta Dye 8 | Ni:naphthol azo imidazole (structure disclosed in WO0148090 and 10/094911) | 3.1 | 2.7 | 1.8 |
| Reactive Red 180 (RR180) | H-acid | 2.5 | 2.6 | 3.8 |
| Magenta Dye 9 | γ-acid | 4.1 | 2.8 | 1.1 |
| Magenta Dye 10 | H-acid | 2.4 | 2.2 | 3.6 |
| Magenta Dye 11 | H-acid | 3.2 | 2.9 | 4.1 |
| M377 (disclosed in 6,423,375) | γ-acid | 4.4 | 3.2 | 1.0 |
| Magenta Dye 12 | γ-acid | 5.0 | 3.0 | 2.9 |
| Reactive Red 31 (RR31) | H-acid | 2.1 | 1.9 | 6.5 |
| Reactive Red 23 (RR23) | Cu:azo | 3.3 | 5.0 | 4.7 |
| Magenta Dye 13 | Ni:pyridyl azo quinoline | 2.0 | 4.5 | 8.6 |
| Acid Red 52 (AR52) | xanthene | 3.0 | 6.9 | 6.1 |
| Acid Red 289 (AR289) | xanthene | 1.7 | 4.2 | 4.9 |
| C.I. Acid Red 81 | anthra-pyridone | 5.8 | 5.2 | 2.0 |
| Magenta Dye 14 | anthra-pyridone | 4.0 | 4.2 | 4.5 |

TABLE 2

| Dye | Structure | % OD Loss Media 2 | % OD Loss Media 3 |
|---|---|---|---|
| Magenta Dye 4 | H-acid | 4% | 0% |
| Magenta Dye 3 | Cu | 2% | 1% |
| Magenta Dye 14 | anthrapyridone | 2% | 1% |
| Magenta Dye 7 | H-acid | 3% | 2% |
| Magenta Dye 11 | H-acid | 5% | 2% |
| Magenta Dye 15 | azo | 4% | 2% |
| Reactive Red 31 (RR31) | H-acid | 4% | 2% |
| Magenta Dye 6 | Copper azo | 4% | 3% |
| Reactive Red 180 (RR180) | H-acid | 3% | 3% |
| Magenta Dye 10 | H-acid | 3% | 4% |
| Acid Red 289 (AR289) | xanthene | 2% | 4% |
| C.I. Acid Red 81 | anthrapyridone | 4% | 4% |
| Acid Red 249 | azo | 7% | 4% |
| Reactive Red 23 (RR23) | Cu:azo | 5% | 5% |
| Magenta Dye 1 | Ni:pyridyl azo naphthol | 9% | 8% |
| Magenta Due 2 | Ni:pyridyl azo naphthol | 10% | 9% |
| Acid Red 52 (AR52) | xanthene | 17% | 13% |
| M377 (disclosed in 6,423,375) | γ-acid | 36% | 14% |
| Magenta Dye 8 (structure disclosed in WO0148090 and 10/094911) | Ni:naphthol azo imidazole | 25% | 17% |
| Magenta Dye 5 | γ-acid | 46% | 25% |
| Magenta Dye 9 | γ-acid | 60% | 35% |
| Magenta Dye 12 | γ-acid | 64% | 45% |
| Magenta Dye 13 | Ni-pyridyl azo quinoline | 78% | 47% |

Example 2

Twenty three different magenta dyes were tested for airfade as follows. Each magenta dye was applied to two different types of inkjet printable media: Media 2 (porous, $Al_2O_3$ coated) and Media 3 (porous, $SiO_2$ coated). Each dye was therefore tested on two different media samples. Each sample was submitted to a 48 day dark forced air fade (30–50% Relative Humidity, 23–25° C.). The dyes are listed in Table 2 in order of performance on Media 3, an $SiO_2$ coated media. The tests showed that H-acids and anthrapyridones are airfast. PAN dyes are moderately airfast. γ-acids and PAQ dyes are not airfast. Media 2, porous coated with $Al_2O_3$, is less airfast relative to those on Media 3 which is $SiO_2$ coated. No airfade is observed on Media 1 which is swellable media. Furthermore it has been observed that only γ-acids exhibit air fade on plain paper. For use in this example, besides the dyes specifically mentioned in the Detailed Description section above, other related dyes are used, all of which are also used in Example 1, which fall in the categories of H-acids, γ-acids, xanthenes, polyvalent metal coordinated dyes, and anthrapyridones. They include: Magenta Dye 1 (Ni:pyridyl azo naphthol); Magenta Dye 2 (nickel:pyridyl azo naphthol); Magenta Dye 3 (copper: pyridyl azo naphthol); Magenta Dye 4 (azo:H-acid); Magenta Dye 6 (cooper: pyridyl azo naphthol); Magenta Dye 7 (azo:H-acid); Magenta Dye 8 (nickel:naphthol azo imidazole); Magenta Dye 9 (azo:γ-acid); Magenta Dye 10 (azo:H-acid); Magenta Dye 11 (azo:H-acid); Magenta Dye 12 (azo:γ-acid); Magenta Dye 13 (nickel: pyridyl azo quinoline); Magenta Dye 14 (anthrapyridone); Magenta Dye 15 (azo).

Example 3

Twenty three different magenta dyes were tested for lightfade as follows. Each magenta dye was applied to four different types of inkjet printable media samples: Media 1 (swellable), Media 2 (porous, $Al_2O_3$ coated), Media 4 (porous, $SiO_2$ coated, different bore than Media 3) and Media 5 (plain paper, cellulose based). Years to failure were estimated using a 19 year simulated light fade process under glass. The dyes were sorted in Table 3 in order of the light fade performance of the dyes on Media 4 (porous, $SiO_2$ coated). It was found that dyes on Media 1 (swellable) were more lightfast relative to the same dyes on other media. Metallized dyes and γ-acids were the most lightfast. Xanthenes, H-acids, and anthrapyridones were comparatively not lightfast. γ-acid dyes were found to be more lightfast on Media 4 (porous, $SiO_2$ coated) than Media 2 (porous, $Al_2O_3$ coated) presumably because of the different bore size of the $Al_2O_3$ coating. For use in this example, besides the dyes specifically mentioned in the Detailed Description section above, other related dyes, most of which mentioned in Examples 1 and 2, are used which fall in the categories of H-acids, γ-acids, xanthenes, polyvalent metal coordinated dyes, and anthrapyridones. They include: Magenta Dye 1 (nickel:pyridyl azo naphthol); Magenta Dye 2 (nickel:pyridyl azo naphthol); Magenta Dye 3 (copper: pyridyl azo naphthol); Magenta Dye 4 (azo:H-acid); Magenta Dye 5 (azo:γ-acid); Magenta Dye 6 (cooper: pyridyl azo naphthol); Magenta Dye 7 (azo:H-acid); Magenta Dye 8 (Ni:naphthol azo imidazole); Magenta Dye 9 (azo:γ-acid); Magenta Dye 10 (azo:H-acid); Magenta Dye 11 (azo:H-acid); Magenta Dye 12 (azo:γ-acid); Magenta Dye 13 (nickel:pyridyl azo quinoline); Magenta Dye 14 (anthrapyridone); and Magenta Dye 15 (azo).

TABLE 3

| Dye | Structure | Years to failure under glass | | | |
|---|---|---|---|---|---|
| | | Media 1 | Media 2 | Media 4 | Media 5 |
| Reactive Red 23 (RR23) | Cu:azo | 30+ | 30+ | 30+ | 30+ |
| Magenta Dye 3 | Cu:naphthol azo imidazole | 30+ | 30+ | 30+ | 30+ |
| Magenta Dye 8 (structure disclosed in WO0148090 and 10/094911) | Ni:naphthol azo imidazole | 30+ | 30+ | 30+ | 30+ |
| Magenta Dye 9 | γ-acid | 30+ | 23.2 | 30+ | 26.4 |
| M377(disclosed in 6,423,375) | γ-acid | 30+ | 16.3 | 30+ | 24.1 |
| Magenta Dye 1 | Ni:pyridyl azo naphthol | 30+ | 18.3 | 28.1 | 26.0 |
| Magenta Dye 12 | γ-acid | 30+ | 14.1 | 24.5 | 13.5 |
| Magenta Dye 2 | Ni:pyridyl azo naphthol | 30+ | 12.9 | 21.0 | 18.7 |
| Magenta Dye 5 | γ-acid | 30+ | 9.9 | 18.7 | 13.6 |
| Magenta Dye 10 | H-acid | 19.9 | 15.6 | 15.6 | 6.3 |
| Magenta Dye 13 | Ni-pyridyl azo quinoline | 30+ | 16.4 | 12.9 | 30+ |
| Magenta Dye 6 | Copper azo | 29.4 | 10.0 | 10.3 | 15.5 |
| Magenta Dye 14 | anthrapyridone | 14.9 | 14.4 | 7.0 | 8.9 |
| Magenta Dye 7 | H-acid | 12.8 | 8.9 | 5.8 | 3.0 |
| Reactive Red 180 (RR180) | H-acid | 10.5 | 6.2 | 5.5 | 3.3 |
| Magenta Dye 11 | H-acid | 11.3 | 7.0 | 3.4 | 2.7 |
| C.I.Acid Red 81 | anthrapyridone | 5.3 | 4.4 | 3.4 | 6.5 |
| Acid Red 249 | azo | 11.8 | 5.5 | 2.6 | 3.1 |
| Reactive Red 31 (RR31) | H-acid | 6.5 | 3.3 | 2.5 | 2.4 |
| Magenta Dye 15 | azo | 12.0 | 4.1 | 2.4 | 10.0 |
| Magenta Dye 4 | H-acid | 14.8 | 7.2 | 1.9 | 3.8 |
| Acid Red 289 (AR289) | xanthene | 2.3 | 1.7 | 1.8 | 2.0 |
| Acid Red 52 (AR52) | xanthene | 1.1 | 1.2 | 1.1 | 1.1 |

Example 4

Of the inks tested in Examples 1, 2 and 3, some were applied in a light load and some were applied in a dark load. In Table 4, the results of some light load and dark load magenta samples were compared. Magenta Dye 4, Magenta Dye 10 and C.I. Acid Red 81 dyes were each applied in a dark magenta load to Media 4. By the same token, Magenta Dye 3 and Magenta Dye 1 were each applied in a light magenta load to Media 4. The results are shown in Table 4. For use in this example, besides the dyes specifically mentioned in the Detailed Description section above, other related dyes already mentioned in Examples 1, 2 and 3, are used which fall in the categories of H-acids, γ-acids, xanthenes, polyvalent metal coordinated dyes, and anthrapyridones. They include: Magenta Dye 1 (nickel:pyridyl azo naphthol); Magenta Dye 3 (copper: pyridyl azo naphthol); Magenta Dye 4 (azo:H-acid); Magenta Dye 10 (azo:H-acid).

TABLE 4

| | Dyes | Humidfastness | Air Fade (48 day test) | LF glass |
|---|---|---|---|---|
| Dark Magenta Load | Magenta Dye 4 | 1.8 ΔE | 0% | 1.9y |
| | Magenta Dye 10 | 3.6 ΔE | 4% | 15.6y |
| | C.I. Acid Red 81 | 2.0 ΔE | 4% | 3.4y |
| Light Magenta Load | Magenta Dye 3 | 2.3 ΔE | 1% | 30+y |
| | Magenta Dye 1 | 0.8 ΔE | 8% | 26y |

Example 5

Two inkjet printing systems, a system with both light and dark magenta inks and a system with just dark magenta ink, were used to plot the relationship between the time to reach 25% Optical Density Loss in a 200 day dark forced air fade (30–5-% Relative Humidity, 23–25° C.) in the printed ink images printed by the two systems and the initial optical density of the printed ink images, thus showing comparative air fade in the two systems. FIG. 1 plots the relationship on a graph. The graph shows a dramatic difference between the images printed with the system having both light and dark magenta ink and the system having just dark magenta ink. The first system with the light and dark inks takes a much longer time to reach 25% Optical Density Loss than the second system. Initially the first system prints with just the light magenta ink and gradually more dark ink is added. The time for 25% optical density loss drops precipitously as the initial optical density increases due to the dark ink coming to constitute a larger and larger part of the ink mixture. In contrast, the time for 25% optical loss remains essentially the same for the second system having just the dark ink because as the initial optical density increases the proportion of dark ink does not increase in the second system, but remains the same, 100%. The time to reach 25% optical density in both systems is a good indicator of relative airfastness.

Example 6

Eight different yellow dyes were tested for airfade as follows. Each yellow dye was applied to three different types of inkjet printable media: Media 6 (porous $Al_2O_3$ coated); Media 4 (porous $SiO_2$ coated); Media 7 (porous $SiO_2$ coated). Each dye was therefore tested on three different media samples. Each sample was submitted to a 57 day dark forced air fade (30–50% Relative Humidity, 23–25° C.). The dyes are listed in Table 6 in order of performance on Media 6, Media 4 and Media 7. The tests showed that azo and disazo yellow dyes are airfast, with Yellow Dye 3 being less airfast than the other dyes on all three of the media tested. For use in this example, besides the Y1189 dye specifically mentioned in the Detailed Description section above, other related dyes are used which fall in the categories of azo and disazo yellow dyes. They include: Yellow Dye 1 (azo); Yellow Dye 2 (disazo); Yellow Dye 3 (azo); Yellow Dye 4 (azo); Yellow Dye 5 (disazo); Yellow Dye 6 (azo); Yellow Dye 7 (azo).

TABLE 6

| | | Acc. Air Fade (Days to Fail (57 days)) | | |
|---|---|---|---|---|
| Dye | Structure | Media 6 (porous $Al_2O_3$ coated) | Media 4 (porous $SiO_2$ coated) | Media 7 (porous $SiO_2$ coated) |
| Yellow Dye 1 | azo | 570+ | 570+ | 570+ |
| Y1189 | azo | 570+ | 570+ | 570+ |
| Yellow Dye 2 | disazo | 570+ | 570+ | 404 |
| Yellow Dye 3 | azo | 293 | 405 | 244 |
| Yellow Dye 4 | azo | 570+ | 570+ | 570+ |
| Yellow Dye 5 | disazo | 570+ | 570+ | 570+ |
| Yellow Dye 6 | azo | 570+ | 570+ | 570+ |
| Yellow Dye 7 | azo | 312 | 570+ | 362 |

Example 7

The eight yellow dyes of Example 6 were tested for lightfade as follows. Each yellow dye was applied to inkjet printable media: Media 1 (swellable) both bare and under glass. Years to failure were estimated using a 21 year simulated light fade process under glass. Yellow dye 1, Y1189, Yellow dye 2 and Yellow dye 3 were found to be equally lightfast and better than Yellow dye 4, Yellow dye 5, Yellow dye 6 and Yellow dye 7.

TABLE 7

| | | Acc. Light Fade (Days to Fail (21 years)) | |
|---|---|---|---|
| Dye | Structure | Media 1, bare | Media 1, glass |
| Yellow Dye 1 | azo | 87 | 158 |
| Y1189 | azo | 49 | 96 |
| Yellow Dye 2 | disazo | 38 | 124 |
| Yellow Dye 3 | azo | 33 | 72 |
| Yellow Dye 4 | azo | 27 | 50 |
| Yellow Dye 5 | disazo | 26 | 53 |
| Yellow Dye 6 | azo | 25 | 46 |
| Yellow Dye 7 | azo | 22 | 49 |

Example 8

Five different cyan dyes were tested for airfade as follows. Each cyan dye was applied to two different types of inkjet printable media: Media 2 (porous $Al_2O_3$ coated); Media 3 (porous $SiO_2$ coated). Each dye was therefore tested on two different media samples. Each sample was submitted to a 69 day dark forced air fade (30–50% Relative Humidity, 23–25° C.). The dyes are listed in Table 8 in order of performance on Media 2 and Media 3. For use in this example, besides 485/4 and 485 dyes specifically mentioned in the Detailed Description section above, other related dyes are used all of which fall in the category of copper phthalocyanine cyan dyes. They include: Cyan Dye 1 (copper phthalocyanine); Cyan Dye 2 (copper phthalocyanine); and Cyan Dye 3 (copper phthalocyanine).

TABLE 8

| | % OD Loss after 69 days | |
|---|---|---|
| Dye | Media 2 (porous $Al_2O_3$ coated) | Media 3 (porous $SiO_2$ coated) |
| Cyan Dye 1 | 3 | 6 |
| 485/4 | 13 | 8 |
| Cyan Dye 2 | 10 | 11 |
| 485 | 29 | 16 |
| Cyan Dye 3 | 41 | 20 |

Example 9

The five cyan dyes of Example 9 were tested for lightfade as follows. Each cyan dye was applied to inkjet printable media: Media 2 (porous $Al_2O_3$ coated); Media 4 (porous SiO2 coated); Media 5 (Cellulose plain paper); and Media 1 (swellable) both bare and under glass. Years to failure were estimated using a 20 year simulated light fade process under glass. As in example 8 above, besides 485/4 and 485 dyes specifically mentioned in the Detailed Description section above, other related dyes are used all of which fall in the category of copper phthalocyanine cyan dyes. They include: Cyan Dye 1 (copper phthalocyanine); Cyan Dye 2 (copper phthalocyanine); and Cyan Dye 3 (copper phthalocyanine).

TABLE 9

| | Acc. Light Fade, Years to Fail (20 yrs, $OD_0$ = 0.5) | | | | | | | |
|---|---|---|---|---|---|---|---|---|
| | Media 2 (porous $Al_2O_3$ coated) | | Media 4 (porous SiO2 coated) | | Media 5 (Cellulose plain paper) | | Media 1 (swellable) | |
| Dye | bare | glass | bare | glass | bare | glass | bare | glass |
| Cyan Dye 1 | 50+ | 50+ | 50+ | 50+ | 50+ | 50+ | 50+ | 50+ |
| Cyan Dye 2 | 22 | 50+ | 19 | 50+ | 50+ | 50+ | 50+ | 50+ |
| 485/4 | 12 | 50+ | 19 | 50+ | 50+ | 50+ | 50+ | 50+ |
| Cyan Dye 3 | 5 | 34 | 12 | 50+ | 49 | 50+ | 43 | 50+ |
| 485 | 6 | 36 | 13 | 50+ | 45 | 50+ | 33 | 50+ |

Example 10

A black dye, Black Dye 1, (copper:azo), was tested for airfade as follows. The black dye was applied to two different types of inkjet printable media: Media 2 (porous $Al_2O_3$ coated) and Media 3 (porous $SiO_2$ coated). The dye was therefore tested on two different media samples. Each sample was submitted to a 69 day dark forced air fade (30–50% Relative Humidity, 23–25° C.).

TABLE 10

| | % OD Loss | |
|---|---|---|
| Dye | Media 2, (porous $Al_2O_3$ coated) | Media 3 (porous, $SiO_2$ coated) |
| Black Dye 1 | 39 | 23 |

Example 11

The copper:azo black dye, Black Dye 1, of Example 10 was tested for lightfade as follows. The dye was applied to inkjet printable media: Media 2 (porous $Al_2O_3$ coated); Media 4 (porous SiO2 coated); Media 5 (Cellulose plain paper); and Media 1 (swellable) both bare and under glass. Years to failure were estimated using a 20 year simulated light fade process under glass.

TABLE 11

Acc. Light Fade, Years to Fail (20 yrs, $OD_0 = 0.5$)

| Dye | Media 2, (porous $Al_2O_3$ coated) | | Media 4 (porous, $SiO_2$ coated) | | Media 5 (plain paper, cellulose based) | | Media 1 (swellable media) | |
|---|---|---|---|---|---|---|---|---|
| | Bare | Glass | Bare | Glass | Bare | Glass | Bare | Glass |
| Black Dye 1) | 4 | 27 | 8 | nf | 50+ | 50+ | 50+ | 50+ |

What is claimed is:

1. An ink set for ink-jet printing, wherein at least one ink of the ink set comprises a light dye load and a dark dye load, both the light dye load and the dark dye load being one color, the one color being selected from the group consisting of magenta, cyan, yellow and black; and the light dye load being air fade resistant.

2. The ink set for ink-jet printing of claim 1, wherein the light dye load is from 0.1% to 2.0% by weight and the dark dye load is from 2.0% to 10.0% by weight.

3. The ink set for ink-jet printing of claim 1, wherein the light dye load is a light magenta dye load and the dark dye load is a dark magenta dye load.

4. The ink set for ink-jet printing of claim 3, wherein the ink set further comprises cyan ink and yellow ink.

5. The ink set for ink-jet printing of claim 4, wherein the cyan ink comprises both a dark cyan dye load and a light cyan dye load.

6. The ink set for ink-jet printing of claim 4, wherein the ink set further comprises black ink.

7. The ink set for ink-jet printing of claim 3, wherein dye of the light magenta dye load is selected from the group consisting of anthrapyridone dyes, h-acid dyes, gamma acid dyes, xanthene type dyes, polyvalent metal coordinated dyes and mixtures thereof.

8. The ink set for ink-jet printing of claim 1, wherein the light dye load is a light yellow dye load and the dark dye load is a dark yellow dye load.

9. The ink set for ink-jet printing of claim 8, wherein the ink set further comprises cyan ink and magenta ink.

10. The ink set for ink-jet printing of claim 9, wherein the cyan ink comprises both a dark cyan dye load and a light cyan dye load.

11. The ink set for ink-jet printing of claim 9, wherein the magenta ink comprises both a dark magenta dye load and a light magenta dye load.

12. The ink set for ink-jet printing of claim 9, wherein the ink set further comprises black ink.

13. The ink set for ink-jet printing of claim 8, wherein dye of the light yellow dye load is selected from the group consisting of monoazo dyes, disazo dyes and mixtures thereof.

14. The ink set for ink-jet printing of claim 1, wherein the light dye load is a light cyan dye load and the dark dye load is a dark cyan dye load.

15. The ink set for ink-jet printing of claim 14, wherein the ink set further comprises magenta ink and yellow ink.

16. The ink set for ink-jet printing of claim 15, wherein the magenta ink comprises both a dark magenta dye load and a light magenta dye load.

17. The ink set for ink-jet printing of claim 15, wherein the ink set further comprises black ink.

18. The ink set for ink-jet printing of claim 14, wherein dye of the light cyan dye load is selected from the group consisting of phthalocyanines, metal modified phthalocyanines and mixtures thereof.

19. The ink set for ink-jet printing of claim 1, wherein the light dye load is a light black dye load.

20. The ink set for ink-jet printing of claim 19, wherein the ink set further comprises magenta ink, cyan ink and yellow ink.

21. The ink set for ink-jet printing of claim 20, wherein the cyan ink comprises both a dark cyan dye load and a light cyan dye load.

22. The ink set for ink-jet printing of claim 4, wherein the magenta ink comprises both a dark magenta dye load and a light magenta dye load.

23. The ink set for ink-jet printing of claim 19, wherein dye of the light black dye load comprises azo dyes.

24. The ink set for ink-jet printing of claim 1, wherein the dyes of the dark dye load are the same as the dyes of the light dye load.

25. The ink set for ink-jet printing of claim 1, wherein at least one dye of the dark dye load is different from a dye used in the light dye load.

26. The ink set for ink-jet printing of claim 1, wherein all of the dyes of the dark dye load are different from all of the dyes of the light dye load.

27. The ink set for ink-jet printing of claim 1, wherein the dark dye load comprises an air fade resistant dye.

28. A method for inkjet printing, the method comprising the step of ejecting ink from an inkjet, the ink comprising a light dye load and a dark dye load, both the light dye load and the dark dye load being one color, the one color being selected from the group consisting of magenta, cyan, yellow and black; and the light dye load being air fade resistant.

29. The method for ink-jet printing of claim 28, wherein the light dye load is from 0.1% to 2.0% by weight and the dark dye load is from 2.0% to 10.0% by weight.

30. The method for ink-jet printing of claim 28, wherein the light dye load is a light magenta dye load and the dark dye load is a dark magenta dye load.

31. The method for ink-jet printing of claim 30, wherein the ink set further comprises cyan ink and yellow ink.

32. The method for ink-jet printing of claim 31, wherein the cyan ink comprises both a dark cyan dye load and a light cyan dye load.

33. The method for ink-jet printing of claim 31, wherein the ink set further comprises black ink.

34. The method for ink-jet printing of claim 30, wherein dye of the light magenta dye load is selected from the group consisting of anthrapyridone dyes, h-acid dyes, gamma acid dyes, xanthene type dyes, polyvalent metal coordinated dyes and mixtures thereof.

35. The method for ink-jet printing of claim 28, wherein the light dye load is a light yellow dye load and the dark dye load is a dark yellow dye load.

36. The method for ink-jet printing of claim 35, wherein the ink set further comprises cyan ink and magenta ink.

37. The method for ink-jet printing of claim 36, wherein the cyan ink comprises both a dark cyan dye load and a light cyan dye load.

38. The method for ink-jet printing of claim 36, wherein the magenta ink comprises both a dark magenta dye load and a light magenta dye load.

39. The method for ink-jet printing of claim 36, wherein the ink set further comprises black ink.

40. The method for ink-jet printing of claim 35, wherein dye of the light yellow dye load is selected from the group consisting of azo dyes, disazo dyes and mixtures thereof.

41. The method for ink-jet printing of claim 29, wherein the light dye load is a light cyan dye load and the dark dye load is a dark cyan dye load.

42. The method for ink-jet printing of claim 41, wherein the ink set further comprises magenta ink and yellow ink.

43. The method for ink-jet printing of claim 42, wherein the magenta ink comprises both a dark magenta dye load and a light magenta dye load.

44. The method for ink-jet printing of claim 42, wherein the ink set further comprises black ink.

45. The method for ink-jet printing of claim 41, wherein dye of the light cyan dye load is selected from the group consisting of phthalocyanines and metal modified phthalocyanines.

46. The method for ink-jet printing of claim 28, wherein the light dye load is a light black dye load.

47. The method for ink-jet printing of claim 46, wherein the ink set further comprises magenta ink, cyan ink and yellow ink.

48. The method for ink-jet printing of claim 47, wherein the cyan ink comprises both a dark cyan dye load and a light cyan dye load.

49. The method for ink-jet printing of claim 47, wherein the magenta ink comprises both a dark magenta dye load and a light magenta dye load.

50. The method for ink-jet printing of claim 46, wherein dye of the light black dye load comprises azo dyes.

51. The method for ink-jet printing of claim 28, wherein the dyes of the dark dye load are the same as the dyes of the light dye load.

52. The method for ink-jet printing of claim 28, wherein at least one dye of the dark dye load is different from dye used in the light dye load.

53. The method for ink-jet printing of claim 28, wherein all of the dyes of the dark dye load are different from all of the dyes of the light dye load.

54. The method for ink-jet printing of claim 28, wherein the dark dye load comprises an air fade resistant dye.

* * * * *

UNITED STATES PATENT AND TRADEMARK OFFICE
CERTIFICATE OF CORRECTION

PATENT NO. : 6,824,598 B2  Page 1 of 1
DATED : November 30, 2004
INVENTOR(S) : Thornberry et al.

It is certified that error appears in the above-identified patent and that said Letters Patent is hereby corrected as shown below:

Column 15,
Line 4, delete "29" and insert therfor -- 28 --.

Signed and Sealed this

Twenty-eighth Day of June, 2005

JON W. DUDAS
*Director of the United States Patent and Trademark Office*